US012686367B2

(12) United States Patent
Favaretto

(10) Patent No.: US 12,686,367 B2
(45) Date of Patent: Jul. 21, 2026

(54) MOTOR VEHICLE

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 288 days.

(21) Appl. No.: 18/629,357

(22) Filed: Apr. 8, 2024

(65) Prior Publication Data

US 2024/0343231 A1     Oct. 17, 2024

(30) Foreign Application Priority Data

Apr. 13, 2023     (IT) ........................ 102023000007101

(51) Int. Cl.
B60T 1/06 (2006.01)
B60K 1/02 (2006.01)

(52) U.S. Cl.
CPC ................ B60T 1/062 (2013.01); B60K 1/02 (2013.01)

(58) Field of Classification Search
CPC ... B60K 1/00; B60K 1/02; B60K 1/04; B60K 2001/0416; B60K 7/0007; B60K 2007/0069; B60K 17/043; B60K 17/354; B60K 17/356; B60K 6/54; B60K 6/48; B60K 2006/381; B60K 2006/4825; B60T 1/06; B60T 1/062; F16H 3/093; F16H 3/006; F16H 2200/0056
See application file for complete search history.

(56) References Cited

U.S. PATENT DOCUMENTS

| 11,021,055 B2 | 6/2021 | Crotti et al. |
| 11,364,797 B1 | 6/2022 | Hayes et al. |

| 2001/0011611 A1 | 8/2001 | Poerschmann | |
| 2011/0259657 A1 | 10/2011 | Fuechtner | |
| 2017/0050514 A1 | 2/2017 | Li | |
| 2020/0180426 A1* | 6/2020 | Chopra | B60K 17/22 |
| 2020/0324635 A1* | 10/2020 | Barna | B60L 7/26 |
| 2023/0139342 A1* | 5/2023 | Brolles | B60K 1/00 |
| | | | 475/5 |

FOREIGN PATENT DOCUMENTS

| CN | 110758076 A | 2/2020 |
| CN | 114825831 A | 7/2022 |
| CN | 115230459 A | 10/2022 |
| EP | 3597464 A | 1/2020 |
| FR | 2131643 A5 | 11/1972 |

OTHER PUBLICATIONS

Italian Search Report in IT Application No. 202300007101 mailed Oct. 23, 2023, an English Translation attached hereto (6 pages).

* cited by examiner

*Primary Examiner* — Lori Wu
(74) *Attorney, Agent, or Firm* — Leason Ellis LLP

(57)     ABSTRACT

A motor vehicle comprising: a body defining a front and a rear, with reference to a normal forward driving direction of the motor vehicle; a first axle carried by the front and comprising, in turn, a first and a second front wheel, which can rotate around a first and a second axis, respectively; a second axle carried by the rear and comprising, in turn, a third and a fourth rear wheel, which can rotate around a third and a fourth axis, respectively; a first electric motor carried by the second axle; and a fifth longitudinal axis parallel to the normal forward driving direction; the first electric motor comprises, in turn, a first output shaft capable of rotating around a sixth axis orthogonal to the third and fourth axis and extends from the side of the rear relative to the third and fourth axis, moving parallel to the fifth axis.

10 Claims, 4 Drawing Sheets

MOTOR VEHICLE

CROSS-REFERENCE TO RELATED APPLICATIONS

This patent application claims priority from Italian patent application no. 102023000007101 filed on Apr. 13, 2023, the entire disclosure of which is incorporated herein by reference.

TECHNICAL FIELD

The invention relates to a motor vehicle.

BACKGROUND

Electric motor vehicles comprise, in a known manner:
a front axle comprising a pair of front wheels;
a rear axle comprising a pair of rear wheels; and
a drive assembly comprising at least one electric machine
    operating as electric motor and operatively connected
    to the front and/or rear wheels so as to transmit a drive
    torque to the front and/or rear wheels.
Said motor vehicles further comprise one or more electric batteries designed to power the electric machine with the necessary quantity of electric power.

The range of electric motor vehicles is determined by the quantity of electrical energy than can stored per volume unit in the batteries.

In the state of the art, said value approximately is one tenth of the quantity of energy that can be stored per volume unit through the use of a fossil fuel.

This sets limits to the performances of electric motor vehicles, especially when they are used on tracks or for professional races.

Indeed, as it is known, when driving along a bend, motor vehicles counter centrifugal force through the friction of the tyres against the ground in a radial direction relative to the are described by the bend.

As a consequence, for a given radius of the bend, the square of the maximum travelling speed of a motor vehicle in conditions of grip is proportional to the vertical load acting upon the tyres.

In order to increase said load up to values exceeding the weight of the motor vehicle, motor vehicles are provided with downforce aerodynamic surfaces, namely shaped so as to generate an additional vertical downward thrust. Said vertical downward thrust, known as "downforce", is proportional to the square of the driving speed of the motor vehicle and to a downforce coefficient associated with the shape of the aerodynamic surface.

The increase in said downforce inevitably leads to an increase in the aerodynamic resistance of the motor vehicle.

This is due to the fact that the downforce coefficient of the aerodynamic surface increases as the resistance coefficient increases.

Because of this increase in aerodynamic resistance, electric motors must deliver a greater electric power in order to maintain desired speed values on straight stretches of road.

Said electric power increase further jeopardizes the range of the motor vehicle.

Therefore, in order to increase the range of the motor vehicle, thus enabling an acceptable sports use, the aerodynamic resistance of the motor vehicle should be reduced as much as possible, without jeopardizing the overall weight acting upon the wheels.

In other words, the overall resistance coefficient of the motor vehicle should be reduced, though without affecting the downforce coefficient of the aerodynamic surfaces.

As it is known, said resistance coefficient is determined, to a significant extent, by the layout of the rear portion of the motor vehicle, namely by the dimensions of the motor vehicle along a transverse dimension, which is orthogonal to a normal forward driving direction of the motor vehicle.

Axles are known, for example from EP-A-3597464, which comprise a pair of electric machines operatively connected to respective wheels and comprising respective output shafts arranged parallel to the transverse direction of the motor vehicle.

The dimensions of said electric machines determine a lower limit for the maximum front section of the motor vehicle in the rear portion and, hence, a lower limit for the overall resistance coefficient and for the resulting energy consumptions of the motor vehicle.

In the automotive industry, an electric axle for a motor vehicle is needed, which reduces energy consumptions, though preserving a high aerodynamic load, so as to significantly increase the range of the motor vehicle, especially in racing mode.

Furthermore, the overall inertia of the motor vehicle needs to be reduced, with a consequent improvement in the dynamic performances of the motor vehicle.

US-A-2011/259657, CN-A-110758076, US-A-2017/050514, US-A-2011/011611 and U.S. Pat. No. 11,364,797 disclose a motor vehicle according to the preamble of claim 1.

SUMMARY

The object of the invention is to provide an axle, which is capable of fulfilling at least one of the needs discussed above.

The aforesaid object is reached by the invention, as it relates to a motor vehicle as defined in claim 1.

BRIEF DESCRIPTION OF THE DRAWINGS

The invention will be best understood upon perusal of the following detailed description of a preferred embodiment, which is provided by way of non-limiting example, with reference to the accompanying drawings, wherein.

DESCRIPTION OF EMBODIMENTS

Figure 1:
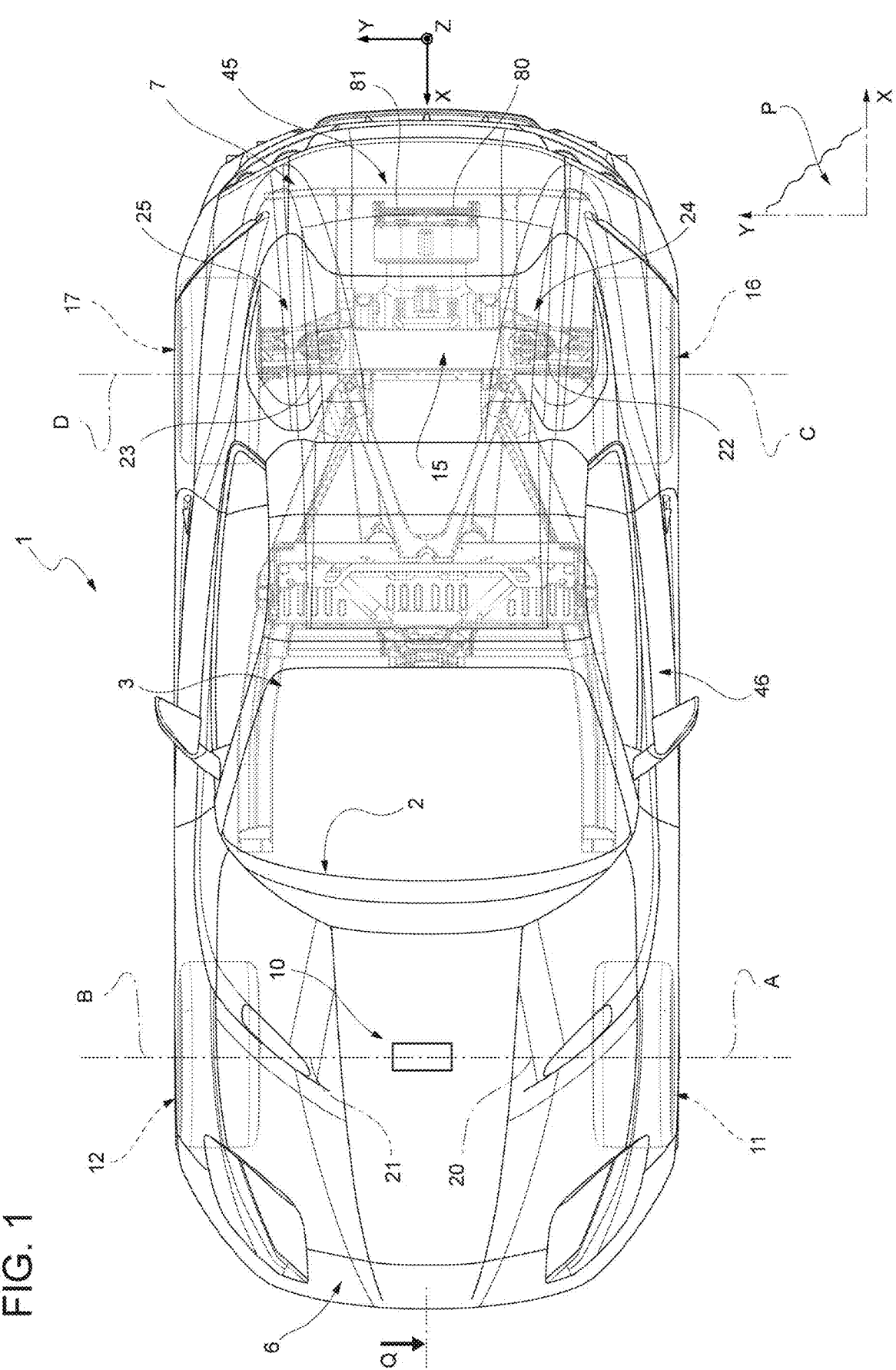
FIG. 1 is a top view of a motor vehicle comprising an axle according to the invention.

With reference to FIG. 1, number 1 indicates a motor vehicle comprising a body 2 defining a passenger compartment 3.

The motor vehicle 1 is a top-of-the-range motor vehicle designed both for a conventional urban/suburban use and for a racing track use.

Furthermore, the motor vehicle 1 is a hybrid or electric vehicle and is provided with electric batteries 96.

Hereinafter, expressions such as "above", "under", "in front of", "behind" and others similar to them are used with reference to normal driving conditions of the motor vehicle 1.

Furthermore, it is possible to define:

a longitudinal axis X integral to the body 2, which, in use, is horizontal and parallel to a normal driving direction of the motor vehicle 1, which is indicated in FIGS. 1 to 4;

a transverse axis X integral to the body 2, which, in use, is horizontal and orthogonal to the axis X; and an axis Z integral to the body 2, which, in use, is vertical and orthogonal to the axes X, Y.

The axes X, Y define a horizontal plane P integral to the body 2 and arranged, in use, substantially horizontal.

The axes X, Z define a vertical plane Q integral to the body 2 and arranged, in use, substantially vertical.

For the purposes of the following disclosure, the plane Q is a longitudinal middle plane of the motor vehicle 1.

The body 2 defines a front 6 and a rear 7, with reference to a normal forward driving direction parallel to the axis X.

The motor vehicle 1 further comprises:

a rear axle 10; and a front axle 15.

The axle 10 comprises, in turn:

a pair of front wheels 11, 12, which can rotate around respective axes A, B; and a pair of axle shafts 20, 21 connected to the respective front wheels 11, 12.

The axle 15 comprises, in turn:

a pair of rear wheels 16, 17, which can rotate around respective axes C, D; and a pair of axle shafts 22, 23 connected to the respective rear wheels 16, 17.

Hence, the motor vehicle 1 comprises:

an unsprung mass 45 (FIG. 2) comprising, in turn, the front wheels 11, 12 and the rear wheels 16, 17;

a sprung mass 46 comprising, in turn, the body 2;

a pair of front suspensions (not shown) of the known kind and configured to elastically suspend the front wheels 11, 12 of the unsprung mass 45 to the body 2 of the sprung mass 46; and a pair of rear suspensions 24, 25 of the known kind and configured to elastically suspend the rear wheels 16, 17 of the unsprung mass 45 to the body 2 of the sprung mass 46.

Each front and rear suspension 24, 25 comprises, extremely in short, an elastic element 28 and a damping element 29 interposed between the respective front wheels 11, 12 (rear wheels 16, 17) and the body 2.

Each front suspension and rear suspension 24, 25 allows the front wheels 11, 12 (rear wheels 16, 17) to move, in a known manner, relative to the body 2, following the irregularities of the ground according to an approximately vertical trajectory, hence parallel to the axis Z.

Consequently, the axes A, B (C, D) of the front wheels 11, 12 (rear wheels 16, 17) always remain approximately parallel to the axis Y of the body 2.

The body 2 further defines (FIG. 2):

a compartment 90 located in front of the axes C, D and accommodating the batteries 96; and a rear end cross member 91 located behind the axes C, D and having a development that is mainly parallel to the axis Y; and a compartment 95 arranged behind the axes C, D.

The axle 15 further comprises:

an electric motor 30 comprising an output shaft 31 operatively connected to the rear wheel 16; and an electric motor 35 comprising an output shaft 36 operatively connected to the rear wheel 17.

The motor vehicle 1 further comprises:

an assembly 37 consisting of the electric motor 30 and of a transmission assembly 40 interposed between the output shaft 31 and the axle shaft 22; and an assembly 38 consisting of the electric motor 31 and of a transmission assembly 41 interposed between the output shaft 32 and the axle shaft 23.

The output shafts 31, 32 can advantageously rotate around respective axes X1, X2 orthogonal relative to the axes C, D and extend from the side of the rear 7, with reference to the axes C, D.

More in detail, the axes X1, X2 are parallel to one another and to a common axis K.

The axis K lies on the plane Q of the motor vehicle 1.

Figure 3:
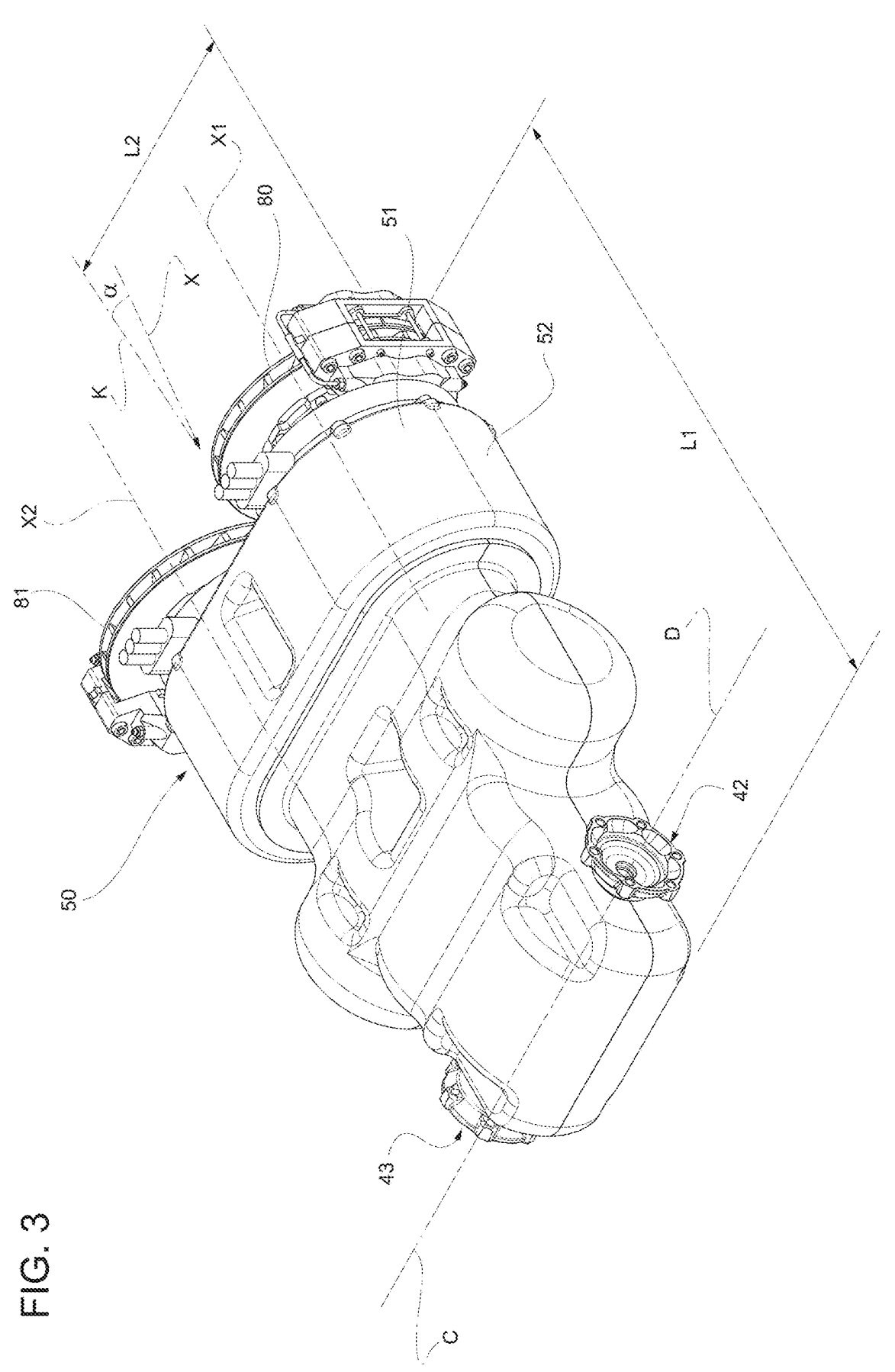
FIG. 3 is a perspective view, in a further larger scale, of some components of the axle of FIGS. 1 and 2.

The axis K defines, with the axis X, an angle α oriented towards the front 7 and ranging from 0 to 90 degrees (FIG. 3).

The angle α is, in the specific case shown herein, five degrees.

Each assembly 37, 38 further comprises (FIGS. 2 to 4):

a brake 80, which can selectively be operated so as to exert a braking torque upon the output shaft 31 and, hence, upon the wheel 16; and a brake 81, which can selectively be operated so as to exert a braking torque upon the output shaft 32 and, hence, upon the wheel 17.

The brakes 80, 81 are, in the specific case shown herein, disc brakes.

The brakes 80, 81 can be operated independently of one another so as to exert respective braking torques, which are independent of one another, upon the respective wheels 16, 17.

Each brake 80, 81 is located at an axial end of the relative electric motor 30, 35 opposite the axis C, D of the relative wheel 16, 17.

The electric motors 30, 35 are accommodated in the compartment 95 and the respective brakes 81, 82 face the cross member 91.

Figure 2:
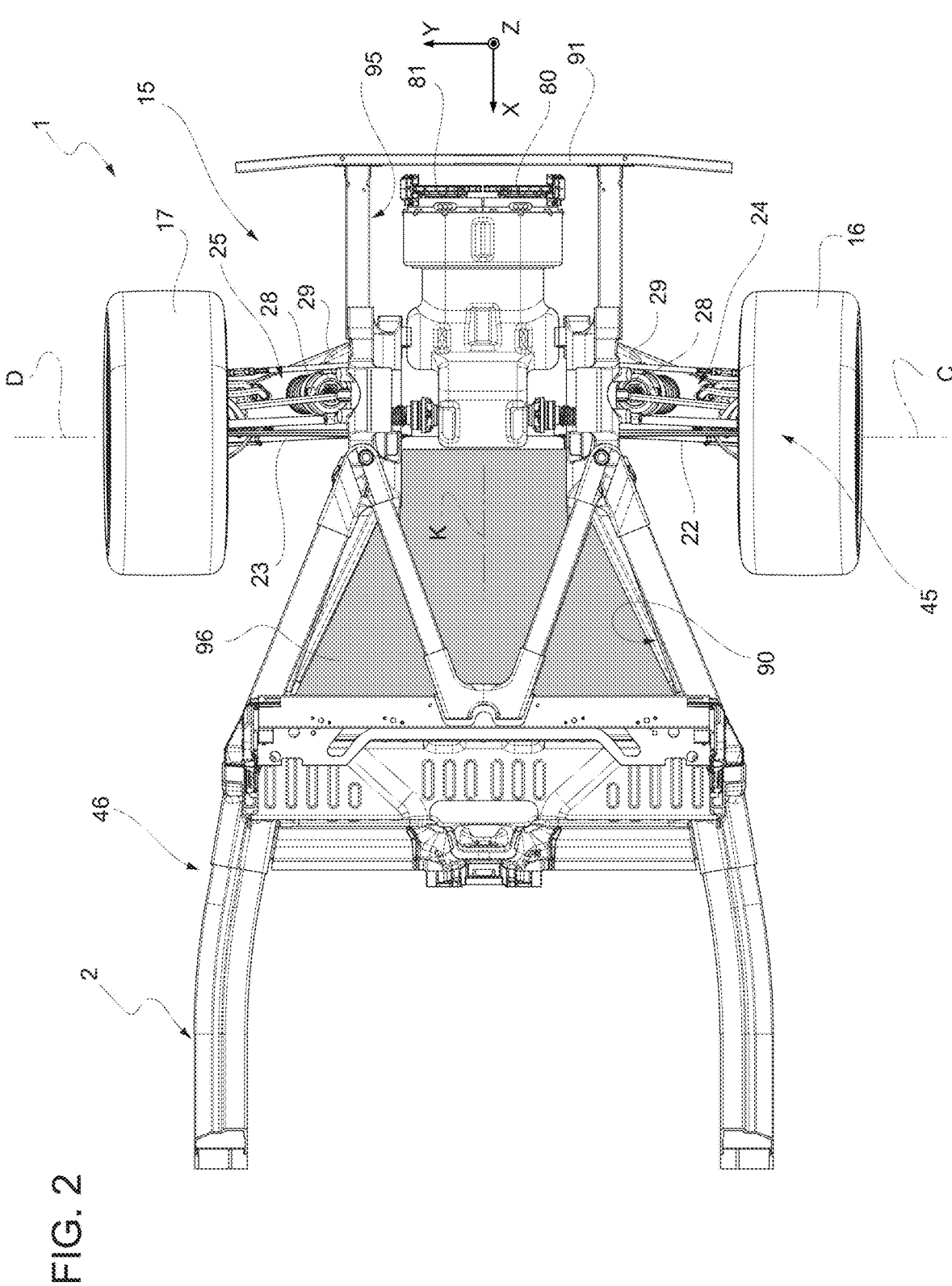
FIG. 2 is a top view, on a much larger scale, of a rear of the motor vehicle and of the axle of FIG. 1.

Each assembly 37, 38 has a length L1 parallel to the axis K, which is greater than a width L2 parallel to the axis Y (FIG. 2).

The motor vehicle 1 further comprises a casing 50 accommodating both motors 30, 35 and the relative transmission assemblies 40.

In particular, the casing 50 serves as stator for the electric motors 30, 35.

The casing 50 has a length L3 parallel to the axes X1, X2 and a width L4 parallel to the axes X1, X2. The length L3 is greater than the length L4 (FIG. 4).

Figure 4:
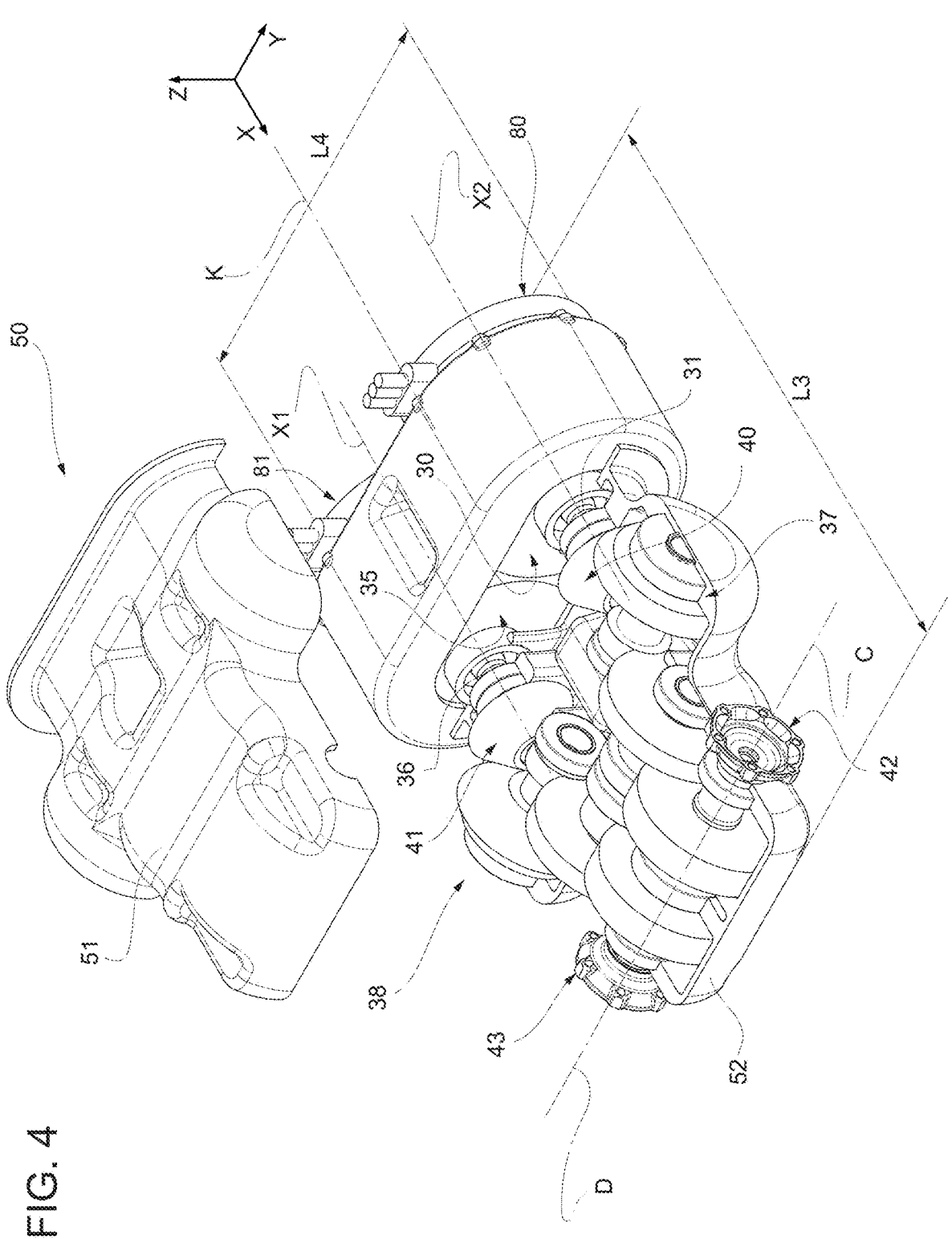
FIG. 4 is an exploded perspective view of the components of the axle of FIG. 3.

Each casing 50 consists of a pair of half-shells 51, 52 shown in FIG. 4.

The motors 30, 35 can be operated independently of one another, so as to exert respective drive torques, which can be adjusted independently of one another, upon the rear wheels 16, 17.

The motor vehicle 1 further comprises an additional braking system (not shown) configured to exert a plurality of further braking torques upon the respective front wheels 11, 12 and rear wheels 16, 17.

The aforesaid braking system could be of the traditional kind, namely acting through "friction".

In use, the electric motors 30, 35 are powered by the electric batteries 96 and are operated independently of one another so as to generate respective drive torques acting upon the rear wheels 16, 17 by means of the corresponding transmission assemblies 40, 41, so as to cause the motor vehicle 1 to move forward.

The brakes 80, 81 can be operated by the driver in order to brake the electric motors 30, 35 and exert, by so doing, respective braking torques upon the rear wheels 16, 17.

The disclosure above reveals evident advantages that can be reached with the invention.

In particular, the electric motors 30, 35 extend from the side of the rear 7 of the body 2 relative to the axes C, D and the output shafts 31, 32 can rotate around respective axes X1, X2 orthogonal to the axes C, D of the corresponding rear wheels 16, 17.

In this way, the electric motors 30, 35 are side by side and are parallel to the axis K of the motor vehicle 1.

This reduces the overall dimensions of the motor vehicle 1 parallel to the axis Y in the region of the axle 15, namely at the rear 7 of the body 2.

This reduction of dimensions allows the body 2—in particular the rear 7—to be shaped according to a more aerodynamic layout compared to known solutions discussed in the introduction to the description.

By so doing, the overall resistance coefficient of the motor vehicle 1 can be reduced, though without affecting the downforce coefficient of the motor vehicle 1.

Therefore, consumptions are reduced and, hence, the range of the motor vehicle 1 increases, preserving at the same time the ability of the motor vehicle 1 to travel along curved trajectories at high speeds.

In short, the motor vehicle 1 ensures particularly high performances and can be used for races.

In addition, the arrangement of the electric motors 30, 35 and of a large part of the respective assemblies 37, 38 behind the axes C, D leaves the compartment 90 completely free for accommodating the electric batteries 96.

Therefore, the electric power stored in the electric batteries 96 can be increased, with consequent further benefits for the range of the motor vehicle 1.

It should be pointed out that said benefits are obtained without necessarily having to increase the wheel base of the motor vehicle 1, namely the distance between the axes A, B of the front wheels 11, 12 and the axes C, D of the rear wheels 16, 17.

The brakes 80, 81 are located inside the compartment 95 and in a position facing the cross member 91 along the axis X.

In this way, in case of a rear hit that causes the cross member 91 to collapse, the brakes 80, 81 protect the respective electric motors 30, 35, thus preserving the ability to move the motor vehicle 1.

The assemblies 37, 38 have a longitudinal length L1 parallel to the axis K, which is greater than transverse length L2 parallel to the axis Y.

Besides the advantages indicated above, this further reduces the overall inertia of the motor vehicle 1, with a consequent improvement in the dynamic performances of the motor vehicle 1.

Finally, the motor vehicle 1 according to the invention can be subjected to changes and variations, which, though, do not go beyond the scope of protection set forth in the appended claims.

In particular, the motor vehicle 1 could comprise one single electric motor 30, 35 connected to one single rear wheel 16, 17 or front wheel 11, 12.

The invention claimed is:

1. A motor vehicle comprising:
   a body defining a front and a rear, with reference to a normal forward driving direction of the motor vehicle;

a first axle carried by said front and comprising, in turn, a first and a second front wheel, which can rotate around a first and a second axis, respectively;

a second axle carried by said rear and comprising, in turn, a third and a fourth rear wheel, which can rotate around a third axis and a fourth axis, respectively;

at least one first electric motor carried by said second axle; and a fifth longitudinal axis parallel to said normal forward driving direction;

said first electric motor comprising, in turn, a first output shaft, which can rotate around a sixth axis orthogonal to said third axis and said fourth axis;

a first braking element operatively connected to said first output shaft and capable of being selectively operated so as to exert a first braking torque upon said first output shaft;

said first braking element being arranged on the opposite side of said first electric motor relative to said third axis and said fourth axis, moving parallel to said fifth longitudinal axis;

said first electric motor extending from the side of said rear relative to said third axis and said fourth axis, moving parallel to said fifth axis;

wherein said rea comprises an end cross member of said body;

said first electric motor and said first braking element being accommodated in a second compartment delimited by said cross member on the opposite side of said third axis and said fourth axis, moving arranged parallel to said fifth axis.

2. The motor vehicle according to claim 1, further comprising a power source electrically connected to said first electric motor and accommodated in a first compartment of said motor vehicle arranged on the side of said front relative to said third axis and said fourth axis, moving parallel to said fifth axis.

3. The motor vehicle according to claim 2, further comprising a second braking element operatively connected to said second output shaft, capable of being selectively operated independently of said first braking element so as to exert a braking torque upon said second output shaft and arranged inside said second compartment on the opposite side of said second electric motor relative to said third axis and said fourth axis, moving parallel to said fifth axis.

4. The motor vehicle according to claim 1, further comprising at least one first transmission assembly interposed between said first electric motor and said third and fourth wheel.

5. The motor vehicle according to claim 1, wherein said first electric motor and said first transmission assembly-have a first length parallel to said sixth axis and a first width orthogonal to said sixth axis; said first length being greater than said first width.

6. The motor vehicle according to claim 1, wherein said first electric motor is operatively connected to said third rear wheel, and further comprising a second electric motor operatively connected to said fourth rear wheel;

said second electric motor comprising, in turn, a second output shaft, which can rotate around a seventh axis orthogonal to said third axis and said fourth axis and parallel to said sixth axis.

7. The motor vehicle according to claim 6, wherein said first transmission assembly is interposed between said first output shaft and said third rear wheel;

said axle further comprising:

a second transmission assembly interposed between said second output shaft and said fourth wheel, a casing accommodating said first electric motor, said second electric motor, said first transmission assembly and said second transmission assembly;

said casing having a second length parallel to said sixth axis and a second width orthogonal to said sixth axis; said second length being greater than said second width.

8. The motor vehicle according to claim 6, wherein said first and second electric motor can be operated independently of one another.

9. The motor vehicle according to claim 1, wherein said sixth axis is inclined relative to said fifth axis.

10. The motor vehicle according to claim 9, wherein said sixth axis is inclined relative to said fifth axis by an angle ranging from 3 to 7 degrees.

* * * * *